US 9,671,255 B2

(12) United States Patent
Wiklund

(10) Patent No.: US 9,671,255 B2
(45) Date of Patent: Jun. 6, 2017

(54) VIBRATION DAMPER FOR SENSOR HOUSING

(71) Applicant: Rosemount Inc., Chanhassen, MN (US)

(72) Inventor: David Eugene Wiklund, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 91 days.

(21) Appl. No.: 14/742,140

(22) Filed: Jun. 17, 2015

(65) Prior Publication Data

US 2015/0308866 A1 Oct. 29, 2015

Related U.S. Application Data

(62) Division of application No. 13/458,303, filed on Apr. 27, 2012, now Pat. No. 9,086,303.

(51) Int. Cl.
| | | |
|---|---|---|
| *G01D 11/24* | (2006.01) | |
| *G01K 1/08* | (2006.01) | |
| *G01F 1/46* | (2006.01) | |
| *G01F 1/688* | (2006.01) | |
| *G01F 15/00* | (2006.01) | |
| *G01F 1/20* | (2006.01) | |

(52) U.S. Cl.
CPC ............ *G01D 11/245* (2013.01); *G01F 1/20* (2013.01); *G01F 1/46* (2013.01); *G01F 1/6888* (2013.01); *G01F 15/00* (2013.01); *G01K 1/08* (2013.01)

(58) Field of Classification Search
CPC .......... G01K 1/08; G01D 11/10; G01D 11/12; G01D 11/245; G01F 1/20; G01F 1/6888; G01F 15/00; G01F 1/46

USPC .................. 73/861.18, 866.5, 430
See application file for complete search history.

(56) References Cited

U.S. PATENT DOCUMENTS

| | | | |
|---|---|---|---|
| 4,001,045 A | 1/1977 | Smith | |
| 4,312,235 A | 1/1982 | Daigle | |
| 4,525,081 A | 6/1985 | Myhre | |
| 4,791,818 A * | 12/1988 | Wilde | ................... G01F 1/3263 73/861.24 |
| 4,958,938 A | 9/1990 | Schwartz et al. | |
| 5,117,695 A | 6/1992 | Henderson et al. | |

(Continued)

FOREIGN PATENT DOCUMENTS

| | | |
|---|---|---|
| EP | 0508832 A1 | 10/1992 |
| EP | 0936376 A2 | 8/1999 |

(Continued)

OTHER PUBLICATIONS

International Searching Authority, International Search Report and Written Opinion, Jul. 8, 2013, 13 pages.

(Continued)

*Primary Examiner* — Lisa Caputo
*Assistant Examiner* — Philip Cotey
(74) *Attorney, Agent, or Firm* — Kinney & Lange, P.A.

(57) ABSTRACT

A sensor probe comprises a tube, a sensor element and an absorber mass. The tube is for placement in a process fluid flow within a fluid conduit and comprises a first end for coupling to the fluid conduit and a second end for insertion into the process fluid flow. The sensor element is in communication with the tube. The absorber mass is coupled to the tube and is configured to dampen vibration of the tube when inserted in the process fluid flow.

17 Claims, 5 Drawing Sheets

(56) References Cited

U.S. PATENT DOCUMENTS

| | | | |
|---|---|---|---|
| 5,404,760 A | 4/1995 | Robinson et al. | |
| 5,423,610 A | 6/1995 | Stansfeld et al. | |
| 6,349,664 B1 | 2/2002 | Brown et al. | |
| 6,470,755 B1 | 10/2002 | Beachey et al. | |
| 6,868,741 B2 | 3/2005 | Harman | |
| 7,836,780 B2 | 11/2010 | Garnett et al. | |
| 2002/0020225 A1 | 2/2002 | Sakai et al. | |
| 2002/0022829 A1 | 2/2002 | Nagase et al. | |
| 2002/0168232 A1 | 11/2002 | Xu et al. | |
| 2003/0080482 A1 | 5/2003 | Desmoulins et al. | |
| 2003/0205860 A1 | 11/2003 | Carlstedt et al. | |
| 2004/0114665 A1 | 6/2004 | Park et al. | |
| 2004/0185702 A1 | 9/2004 | Kurtz et al. | |
| 2004/0201464 A1* | 10/2004 | Oonishi | B60R 21/013 340/436 |
| 2004/0261528 A1 | 12/2004 | Drahm et al. | |
| 2005/0034535 A1 | 2/2005 | Sprague | |
| 2006/0280559 A1 | 12/2006 | Allen et al. | |
| 2008/0031306 A1 | 2/2008 | Yamada et al. | |
| 2009/0038120 A1 | 2/2009 | Eicher et al. | |
| 2009/0049767 A1 | 2/2009 | Georgakis | |
| 2009/0122833 A1 | 5/2009 | Davda | |
| 2009/0211368 A1 | 8/2009 | Garnett et al. | |
| 2010/0003072 A1 | 1/2010 | Duff | |
| 2010/0054301 A1* | 3/2010 | Abe | G01K 1/08 374/148 |
| 2011/0054822 A1 | 3/2011 | Bauschke et al. | |
| 2011/0107829 A1 | 5/2011 | Wood et al. | |
| 2011/0150033 A1 | 6/2011 | Egan et al. | |
| 2012/0186923 A1 | 7/2012 | Buma | |

FOREIGN PATENT DOCUMENTS

| | | |
|---|---|---|
| EP | 1074825 A1 | 2/2001 |
| GB | 2483931 A | 3/2012 |
| JP | H11190667 A | 7/1999 |
| JP | 2000018323 A | 1/2000 |
| JP | 2004294147 A | 10/2004 |
| JP | 3126141 U | 10/2006 |

OTHER PUBLICATIONS

Extended European Search Report for European Patent Application No. 13781589.0, dated Nov. 13, 2015, 6 pages.

Russian Office Action for Russian Patent Application No. 2014137395/28 dated Aug. 31, 2016, 8 pages.

Second Chinese Office Action, for Chinese Patent Application No. 201310097047.X, dated Aug. 3, 2016, 16 pages.

Japanese Office Action, for Japanese Patent Application No. 2015-508983, dated Nov. 30, 2016, 8 pages.

Third Chinese Office Action, for Chinese Patent Application No. 201310097047X, dated Dec. 27, 2016, 15 pages.

* cited by examiner

VIBRATION DAMPER FOR SENSOR HOUSING

CROSS-REFERENCE TO RELATED APPLICATION

This application is a divisional of U.S. application Ser. No. 13/458,303 filed Apr. 27, 2012 for "Vibration Damper For Sensor Housing" by David E. Wiklund. This application claims priority to U.S. application Ser. No. 13/458,303, which is fully incorporated by reference.

BACKGROUND

The present invention relates generally to fluid processing and sensors used for measuring process variables, such as pressure, temperature, level and flow. In particular, the invention relates to thermowells used to sense temperature of flowing fluids. Although, the invention may be applied to any probe having a sensor disposed within a housing configured for insertion into a process fluid flow. Thermowells conventionally comprise a tube that extends through a fluid conduit wall, such as a pipe, so that the exterior of the tube is in thermal communication with the process fluid. A temperature sensor, such as a thermocouple or resistance temperature detector (RTD), is in thermal communication with the interior of the tube to measure the temperature of the process fluid. Wiring extending through the tube connects the temperature sensor to transmitter electronics, which are typically in electronic communication with a process control network through an appropriate wired or wireless network. As such, temperature readings from the temperature sensor can be processed and communicated to a workstation at a process control room.

Within the fluid conduit, the sensor tube is exposed to forces generated by flow of the process fluid. In particular, the sensor tube is subject to a number of stress factors including flow-induced vibrations. Flow-induced vibrations typically arise as a result of vortex shedding and other turbulent flow field effects, which generate periodically alternating forces that excite the resonance of the sensor tube. These forces cause the tube to oscillate back and forth or vibrate, increasing mechanical stress and reducing service life for both the sensor tube and its associated sensor. Flow-induced vibrations are particularly problematic when they occur near a natural resonant frequency, producing forced resonant oscillations that can potentially result in catastrophic failure, such as from repetitive fatigue stress. Even relatively small oscillations can also be an issue, particularly when combined with other stresses such as high drag forces or static pressure gradients, or with corrosion, fatigue, or erosion of the sensor tube structure.

Guidelines, such as those described in ASME PTC 19.3, are established for flow rates at which particular thermowells can be used to avoid resonance frequencies that generate large vibration loads. Problems associated with sensor tube vibrations have previously been addressed by increasing the strength of the sensor tube. This approach requires thicker tube walls or specialized construction, which increases cost, expands the size and weight envelope of the device, decreases sensitivity and increases response time. Alternatively, sensor tubes have been configured to reduce vortex shedding (which causes flow-induced vibrations) such as by including flow disrupting features that force the separation of the boundary layer over the tube to reduce coherence of the vortices. For example, U.S. Pat. No. 7,836,780 to Garnett et al., which is assigned to Rosemount Inc., discloses the use of a helical flow modifying element. However, even with such approaches to vibration reduction, the sensor within the tube is still subject to loading sufficiently high to potentially damage the sensor after prolonged use. There is, therefore, a need to further reduce loading, particularly from vibration, on tubes such as those used in thermowells and averaging pitot sensors.

SUMMARY

The present invention is directed to a sensor probe for sensing a property of a fluid flowing within a fluid conduit. The sensor probe comprises a tube, a sensor element and an absorber mass. The tube is for placement in a process fluid flow within the fluid conduit, and comprises a first end for coupling to the fluid conduit and a second end for insertion into the process fluid flow. The sensor element is in communication with the tube. The absorber mass is coupled to the tube and is configured to dampen vibration of the tube when inserted in the process fluid flow.

DETAILED DESCRIPTION

Figure 1:
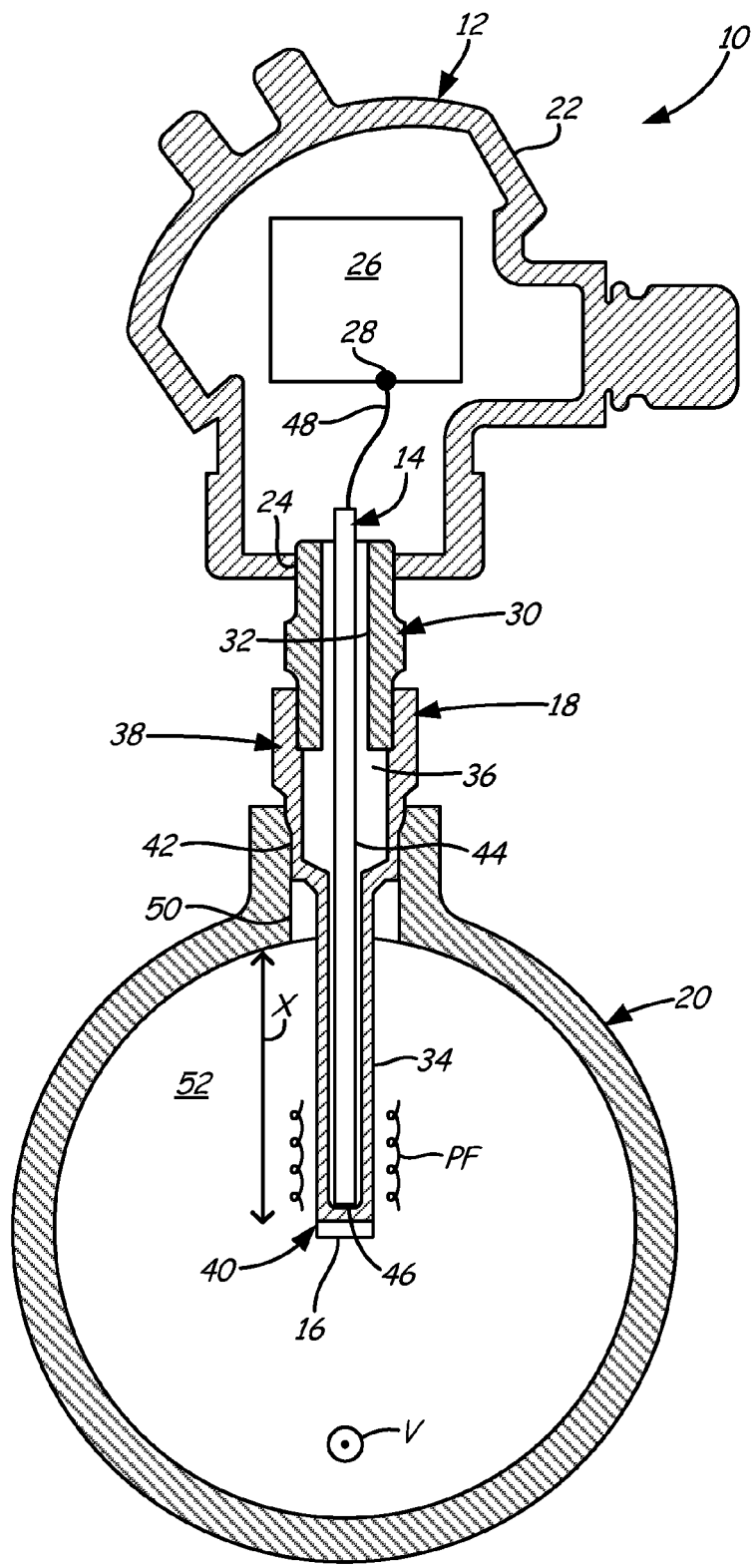
FIG. 1 is a cross-sectional schematic view of a process transmitter including a temperature sensor and vibration absorber mass coupled to a thermowell inserted into a process fluid conduit.

FIG. 1 is a cross-sectional schematic view of one embodiment of the invention showing process transmitter 12 including temperature sensor 14 and vibration absorber mass 16 coupled to thermowell 18, which is inserted into process fluid pipe or conduit 20. Transmitter 12 also includes transmitter housing 22, housing hole 24, transmitter circuitry 26, temperature sensor terminal 28 and thermowell fitting 30 having passage 32. Thermowell 18 includes tube 34, thermowell bore cavity 36, first end 38, second end 40 and process connection portion 42. Temperature sensor 14 includes protection tube 44, temperature sensor tip 46, and temperature sensor lead 48. Thermowell 18, including temperature sensor 14 and tube 34, comprise a probe for insertion into a flow of process fluid.

Transmitter housing 22 encloses interior components of transmitter 12, including transmitter circuitry 26. Transmitter circuitry 26 includes temperature sensor terminal 28 which electrically connects to temperature sensor 14 via temperature sensor lead 48. In various embodiments of the invention, temperature sensor 14 comprises any temperature sensitive device as is known in the art. For example, temperature sensor 14 may comprise a thermocouple or a resistance temperature detector (RTD). In yet other embodiments of the invention, other types of sensors may be inserted into tube 34, such as pressure sensors, level sensors or flow sensors. Temperature sensor 14 is enclosed by long, cylindrical protection tube 44. Temperature sensor lead 48 includes a plurality of wires for making a plurality of electrical connections to a plurality of nodes at each of temperature sensor terminal 28 at circuitry 26. As is known in the art, transmitter circuitry 26 can be coupled, either through a wired control loop or a wireless network, to a control room where output of temperature sensor 14 can be monitored.

Figure 3:
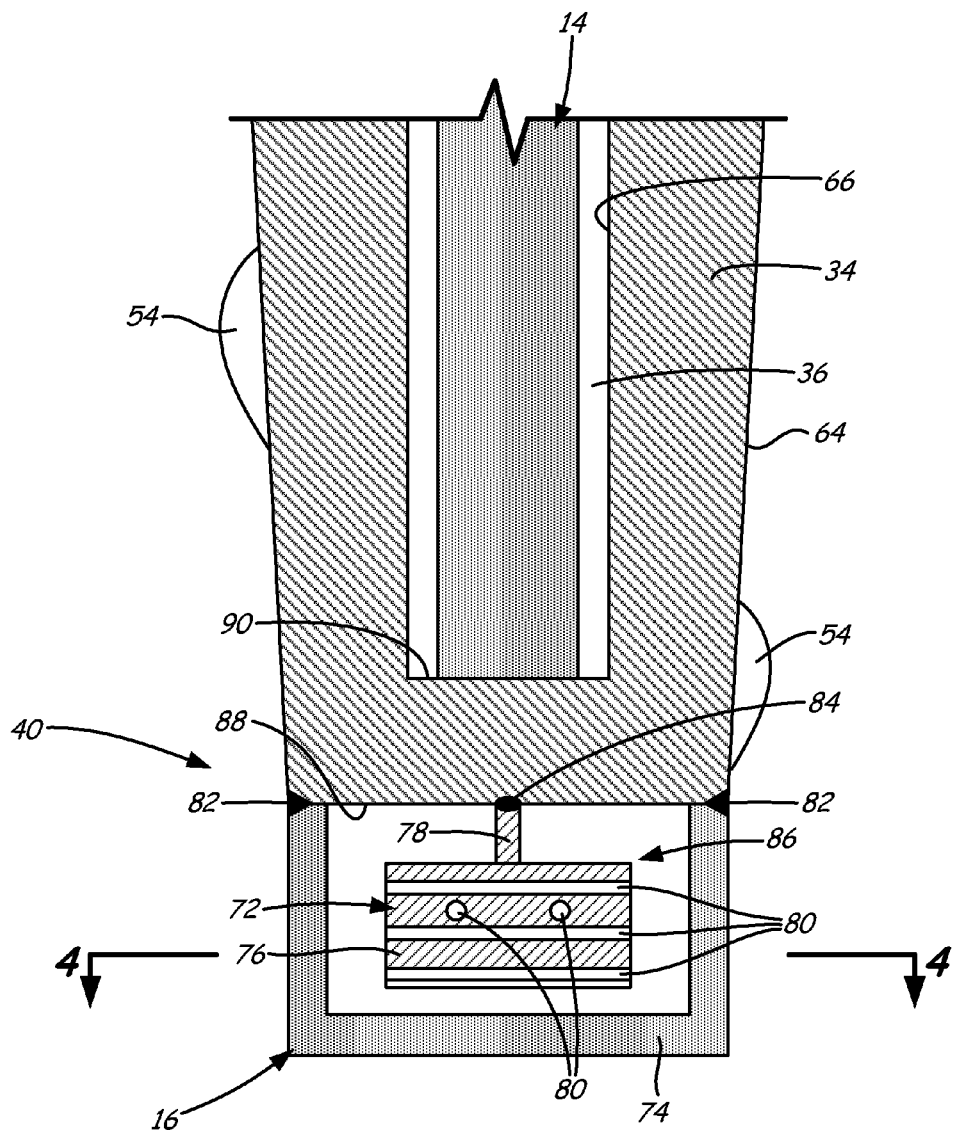
FIG. 3 is a longitudinal cross-sectional view of the thermowell of FIG. 1 in which the vibration absorber mass comprises an externally mounted pendulum.

Pursuant to this embodiment, a first end of thermowell fitting 30 is inserted into hole 24 of housing 22 and a second end of thermowell fitting 30 is inserted into thermowell 18. First end 38 of thermowell 18 receives fitting 30 and the thermowell is coupled to process fluid pipe 20 through connection portion 42, which is disposed between ends 38 and 40. Second end 40 is inserted into hole 50 in process fluid pipe 20. Passage 32 of thermowell fitting 30 connects the interior of housing 22 to thermowell bore cavity 36 in thermowell 18. Tube 44 of sensor 14 extends from the interior of housing 22 through passage 32 and into thermowell bore cavity 36. Tube 44 need not contact thermowell 18, but in various embodiments may do so to increase heat transfer between the two bodies, as shown in FIG. 3. Thermowell 18 is inserted into flow passage 52 within pipe 20 such that second end 40 is in a turbulent flow path of process fluid PF. In alternative embodiments, pipe 20 can comprise any conduit where process fluid flows to cause vibration of tube 34.

For the depicted embodiment, process fluid PF flows through pipe 20 in an axial direction, perpendicular to the plane of FIG. 1, as indicated by velocity vector V. Thermowell 18 extends in a transverse direction x, perpendicular to the axial direction, as indicated by arrow X. Thermowell 18 may also extend into pipe 20 angled with respect to the axial direction or the transverse direction. Thermowell 18 has no particular directionality in terms of rotation about the transverse axis and can, thus, be mounted in hole 50 in any rotational orientation. In any event, the velocity vector V of process fluid PF is significant enough to cause vibration of tube 34.

Figure 2:
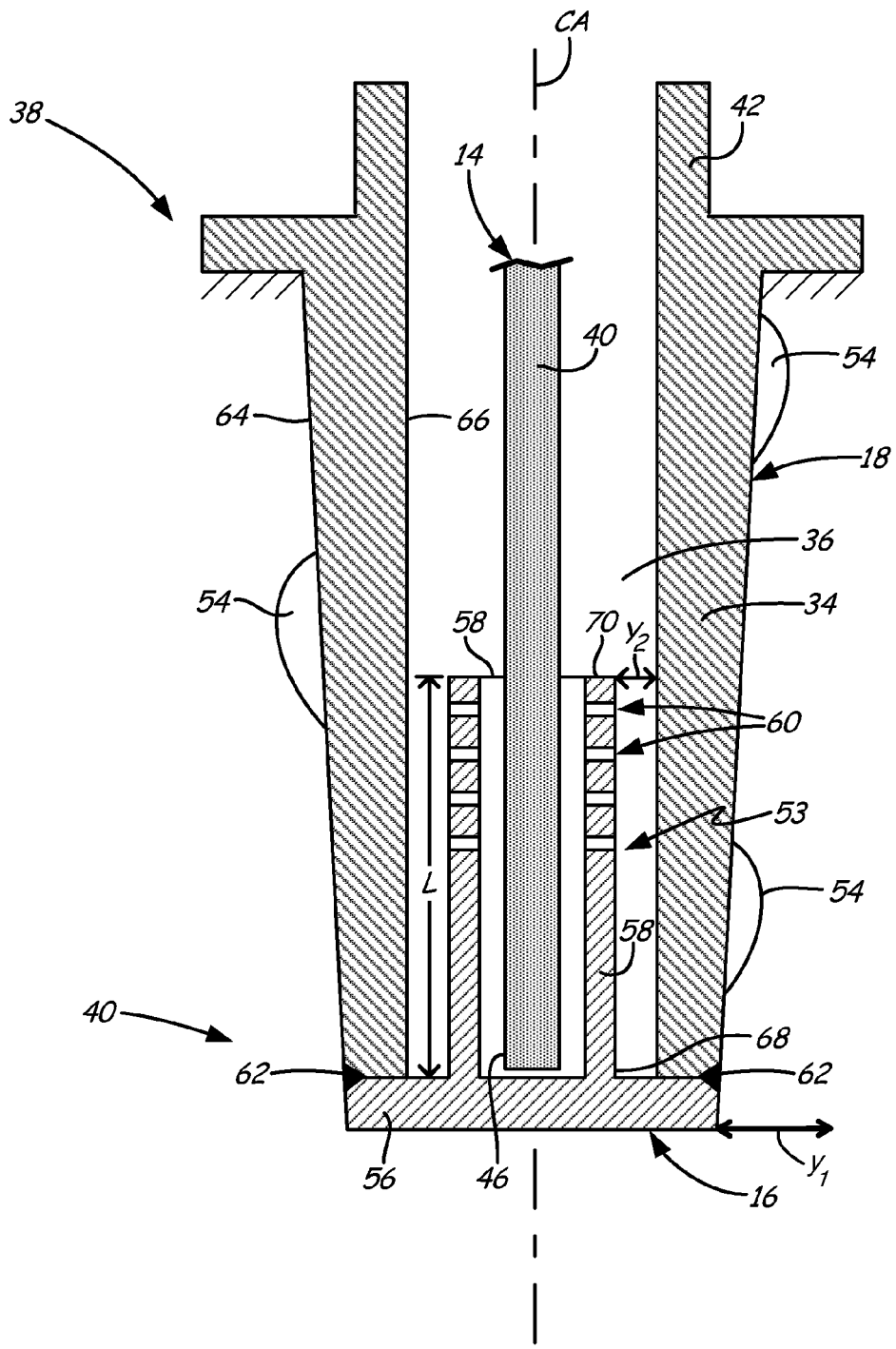
FIG. 2 is a longitudinal cross-sectional view of the thermowell of FIG. 1 in which the vibration absorber mass comprises an internally cantilevered beam.

In the embodiment shown, thermowell 18 comprises elongate tube 34 having bore cavity 36 that is open at first end 38 and closed at second end 40. Tube 34 comprises a sensor housing for receiving temperature sensor 14 or other sensors. Tube 34 may include other access openings so as to accommodate requirements of a pressure sensor, level sensor or flow sensor. For example, tube 34 may include a sealed port to permit a pressure sensor to obtain pressure readings directly from the process fluid. In the embodiment of FIG. 1, tube 34 comprises a cylinder having a circular cross-sectional area with a constant diameter over the transverse length of the tube. That is to say, tube 34 is uniformly rotated about the transverse axis such that the distance between the outer diameter of tube 34 and tube 44 is uniform along the transverse length of tube 34. Tube 34 may comprise other types of rotated cylindrical bodies that are not uniform distant from the transverse axis extending through tube 44. As shown in FIGS. 2 and 3, tube 34 of thermowell 18 may have a wider diameter near first end 38 and a narrower diameter near second end 40 so as to be tapered. In yet other embodiments, tube 34 may be stepped in the transverse direction rather than being tapered. In still other embodiments, tube 34 may have non-circular cross-sections, including, but not limited to, rectilinear cross-sections, oval cross-sections and T-shaped cross-sections.

Process connection portion 42 of thermowell 18 couples to hole 50 in pipe 20. In the illustrated embodiment, process connection portion 42 includes threads for screwing into mating threads on hole 50 of pipe 20, but many other types of mechanisms may be used to secure the thermowell to the pipe. Process connection portion 42 seals the industrial process so that process fluids do not flow from passage 52 out to the exterior of pipe 20. Process connection portion 42 also separates a process side of thermowell 18 from a non-process side of thermowell 18. The non-process side of thermowell 18 includes all portions of thermowell 18 that are isolated from process fluid, such as bore cavity 36 extending through the interior of thermowell 18 and the exterior of first end 38 and process connection portion 42. Bore cavity 36 is sized to allow insertion of temperature sensor 14 so that temperature sensor tip 46 is near second end 40. Improved heat transfer between sensor tip 46 and thermowell 18 can be obtained by filling tube 34 with a thermally conductive fluid, or by bringing sensor tip 46 into contact with thermowell 18, as shown in FIG. 3. Portions of the process side of thermowell 18 are exposed to the flow of process fluids within pipe 20, particularly near the distal tip of second end 40 within passage 52.

Axial flow of process fluid over the process side of thermowell 18 produces various forces that are asserted against thermowell 18. For reference, axial flow velocity is a function of spanwise position x (measured perpendicularly from pipe 20), and average flow velocity V is integrated across the process flow structure. These velocity profiles are characteristic of turbulent flow, which includes non-uniform flow fields that that extend in the axial direction and that are angled to the axial direction. Turbulent flow fields thereby produce two sources of input that can cause vibration of thermowell 18. First, turbulent flow contains energy that is distributed over a broad spectrum of frequencies. Second, the interaction of the thermowell structure with the turbulent fluid flow results in coherent fluid phenomena at specific frequencies.

Considerable efforts have been made to reduce vibration from turbulent flow by reducing vortex shedding through methods that force the separation of the boundary layer to occur at different locations along the span of the thermowell. This reduces the coherence of the vortices and the amplitude of the forces applied to the thermowell from the turbulent flow. As mentioned, U.S. Pat. No. 7,836,780, which is incorporated by this reference, discloses various modifications that can be made to the shape and exterior surface of thermowell 18 to reduce vortex-shedding to acceptable levels.

It is, however, desirable to further reduce vibration of thermowell 18 to eliminate the potential for resonant frequency vibration that may result from the broad spectrum of frequencies to which tube 34 is subject. For example, even after measures to reduce vortex-shedding have been taken, sufficient energy will remain in the process fluid to excite the thermowell at its resonance frequency. The excitation of mechanical resonances due to the energy in turbulent flow is described in Turbulence: The Legacy of A. N. Kolmogorov by Uriel Fisch, Cambridge University Press, 1995, which also describes the difficulty in eliminating resonance vibration. In the present invention, vibration absorber mass 16 is positioned on thermowell 18 to counteract vibration forces from turbulent flow of the process fluid to reduce peak amplitudes over a range of frequencies. In particular, the mass, spring rate and damping coefficient parameters of vibration absorber mass 16 can be selected to reduce amplitude for a given range of expected frequencies. Relationships between mass, spring rate and damping for generic bodies have been described in Mechanical Vibrations, 4$^{th}$ Edition by J. P. Den Hartog, McGraw Hill Book Company, 1956, which also describes the associated reduction in amplitude for optimized parameter selection. In the present invention, these relationships have been adapted and applied to thermowell 18 and vibration absorber mass 16 to eliminate resonant frequency vibration of thermowell 18 for selected flow fields.

According to one embodiment, FIG. 2 is a longitudinal cross-sectional view of thermowell 18 of FIG. 1 in which vibration absorber mass 16 comprises internally cantilevered beam 53. Thermowell 18 also includes tube 34, thermowell bore cavity 36, first end 38, second end 40, process connection portion 42 and flow modifying element 54. Internally cantilevered beam 53 preferably includes plate 56, hollow cylinder 58 and holes 60. Absorber mass 16 is joined to tube 34 at weld joint 62.

Process connection portion 42 is coupled to transmitter housing 22 (FIG. 1) such as with a threaded engagement. Process connection portion 42 may also include a seal, such as an O-ring for fitting around sensor tube 40 within portion 42. As such, cavity 36 is separated from process fluid flow, while the exterior of tube 34 is exposed to turbulent fluid flow. Tube 40 of temperature sensor 14 extends from transmitter housing 22 (FIG. 1) into cavity 36 of tube 34 such that tip 46 is positioned in close proximity to absorber mass 16 at second end 40. As noted above, sensor tip 46 may be configured to contact second end 40. In the embodiment shown, second end 40 of tube 34 is open, while plate 56 seals the opening of the second end.

Tube 34 and temperature sensor tube 40 extends generally vertically from housing 22 parallel to center axis CA. Center axis CA extends transverse to axial fluid flow. In the particular embodiment of FIG. 2, exterior surface 64 of tube 34 tapers from first end 38 to second end 40 with respect to central axis CA. As such, the walls of tube 34 are thicker at first end 38 than at second end 40. Interior surface 66, however, extends generally vertically, parallel to central axis CA. In other words, exterior surface 64 is angled with respect to interior surface 66. As described above, other shapes of tube 34 may be used, such as a circular cylindrical housing, to reduce drag, improve strength of reduce vortex-shedding, as desired. As one example, flow modifying element 54 is positioned on exterior surface 64 to reduce vortex-shedding. In the disclosed embodiment, flow modifying element 54 comprises a helical rib that wraps around exterior surface 64, as disclosed in the aforementioned patent to Garnett et al. It is appreciated that tube 34 may utilize an absorber mass without the use of a flow modifying element.

In this embodiment, plate 56 of absorber mass 16 closes second end 40 to maintain cavity 36 isolated from the process fluid flow. Thus, in the depicted embodiment, plate 56 has the same outer diameter as exterior surface 64 of tube 34. Hollow cylinder 58 comprises an elongate annular body, or tube, having a sidewall that continuously surrounds sensor tube 40. Cylinder 58 can have a round, e.g. ring-like, or rectilinear, e.g. box-like, cross-sectional area A$_O$. Hollow cylinder 58 extends into cavity 36 from plate 56 so to be disposed concentrically around sensor tube 40. Hollow cylinder 58 extends perpendicularly from plate 56 coaxially with central axis CA over a length L. Cylinder 58 may, however, be positioned in other orientations. Fixed end 68 is joined to plate 56, while free end 70 is uninhibited so as to be able to move within cavity 36 a distance y$_2$. As such, cylinder 58 is also parallel to both interior surface 66 and tube 40. In other embodiments, absorber mass 16 may comprise one or more solid cantilevered beams extending from plate 56 to intermittently surround sensor tube 40. For example, four beams having solid, square cross-sectional areas can be spaced ninety degrees apart around the perimeter of sensor tube 40.

Plate 56 and hollow cylinder 58 are preferably integrally formed from the same material so as to comprise a single piece. In other embodiments, they may comprise separate pieces joined together by any suitable means, such as welding or by threaded engagement. Absorber mass 16 may be formed of the same material as tube 34 so that weld joint 62 can be easily formed. However, in other embodiments, absorber mass 16 is formed of different material. In one embodiment, absorber mass 16 and tube 34 are comprised of a stainless steel alloy. In yet another embodiment, absorber mass 16 is secured to tube 34 by other mechanical means such as through the use of a threaded engagement between plate 56 and tube 34.

As thermowell 18 is subjected to turbulent flow, such as from process fluid PF (FIG. 1), tube 34 vibrates at particular frequencies and amplitudes that depend on the flow velocity of the process fluid and the physical attributes of tube 34. Vibration of tube 34 results in vibration at frequencies w and amplitudes a. Light damping is provided by the process fluid or other factors. Vibration of thermowell 18 with such light damping is dictated by a second order differential equation. Thermowell 18 vibrates according to equation (1), where M is the mass of thermowell 18, C is the damping coefficient of thermowell 18, K is the spring rate of thermowell 18, y$_1$ is the deflection of thermowell 18, t is time, and P$_0$ sin(ωt) is the driving input force determined by amplitude a and frequency ω of vibration.

$$M\frac{d^2 y_1}{dt^2} + C\frac{dy_1}{dt} + Ky_1 = P_0\sin(\omega t) \tag{1}$$

Thermowell 18 acts, by itself, as a second order system (spring rate K and damping coefficient C) with a single degree of freedom. The light damping naturally provided by a cantilevered beam in a flowing fluid amounts to a damping coefficient C much less than 0.1. With such light damping, vibration of thermowell 18 at the resonance frequency is amplified by a large factor and induces repeated stress-cycles that can lead to mechanical failure.

In the present invention, absorber mass 16 is coupled to thermowell 18 to counteract vibrational movement of thermowell 18, thereby acting as a damper. Absorber mass 16 of the present invention can achieve much higher damping coefficients, thereby reducing the peak amplitude of deflection at resonance. For example, vibration of thermowell 18 at second end 40 causes corresponding movement of fixed end 68 of beam 58, which causes free end 70 to be displaced distance y$_2$. Characteristics of beam 58, such as elastic modulus E, moment of inertia I, length l and cross-sectional area A$_O$ result in absorber mass 16 having a particular mass m, spring rate k and damping coefficient c that will provide a damping or absorbing body that counteracts vibration of thermowell 18. Absorber mass 16 and thermowell 18 vibrate according to equations (2) and (3), where the input force P$_0$ sin(ωt) is the driving force determined by the amplitude a and frequency ω of vibration.

$$M\frac{d^2 y_1}{dt^2} + c\left(\frac{dy_1}{dt} - \frac{dy_2}{dt}\right) + Ky_1 + k(y_1 - y_2) = P_0\sin(wt) \tag{2}$$

-continued $$m\frac{d^2y_2}{dt^2} + c\left(\frac{dy_2}{dt} - \frac{dy_1}{dt}\right) + k(y_2 - y_1) = 0 \qquad (3)$$

The addition of absorber mass 16 results in a second order system (spring rates K and k, and damping coefficients C and c) having two degrees of freedom. Note that in equations (2) and (3) the damping provided by mass M is negligible such that the equation terms for damping coefficient C is omitted for simplicity. Using known relationships, mass m, length 1, cross-sectional area $A_0$, moment of inertia I and elastic modulus E of vibration absorber mass 16, such as beam 53, are selected to closely match the resonant frequency of tube 34. Selected as such, beam 58 applies an oscillating positive and negative force to thermowell 18 to dampen vibration imparted from the process fluid flow. The behavior of this system is such that the amplitude at the resonant frequency of tube 34 is greatly reduced, thus reducing the stress levels and improving its resistance to fatigue failures.

To further assist absorber mass 16 in accomplishing dampening of the vibration of thermowell 18, tube 34 can be filled with a fluid, such as liquid or gas, to achieve the desired damping coefficient c of beam 53. In particular, beam 53 is provided with holes 60 through which the fluid is allowed to flow as the beam moves. The motion of beam 53 through the fluid results in a retarding force that is proportional to the velocity of the beam, thus giving the desired value of the damping coefficient c. As shown, holes 60 extend radially through cylinder 58 so as to be oriented in different directions with respect to center axis CA. The fluid, the number of holes and the size of the holes can be selected to achieve the desired damping coefficient. The damping forces will also be applied to beam 53 with no holes as the fluid moves past beam 53. As is known in the art, the fluid can also be configured to increase heat transfer between thermowell 18 and sensor tip 46.

According to another embodiment, FIG. 3 is a longitudinal cross-sectional view of thermowell 18 of FIG. 1 in which vibration absorber mass 16 comprises externally mounted pendulum 72. Thermowell 18 also includes tube 34, thermowell bore cavity 36, second end 40 and flow modifying element 54, as described above. Absorber mass 16 includes cap 74, disk 76, rod 78 and holes 80. Cap 74 is joined to tube 34 at weld joint 82 and rod 78 is joined to tube 34 at weld joint 84. Internal area 86 is formed between tube 34 and cap 74.

In the embodiment of FIG. 3, tube 34 is integrally closed at second end 40. Specifically, exterior surface 64 of tube 34 is joined by end surface 88. Similarly, interior surface 66 is joined by internal surface 90. As such, thermowell bore cavity 36 is sealed-off from the exterior of thermowell 18 by material integral with the rest of tube 34.

Rod 78 is preferably comprised of the same material as tube 34 to facilitate fabrication of weld joint 84. Similarly, cap 74 is comprised of the same material as tube 34 to facilitate fabrication of weld joint 82. In one embodiment, cap 74 and rod 78 are formed of a stainless steel alloy. In other embodiments, cap 74 and rod 78 are formed of materials different than that of tube 34. In yet other embodiments, cap 74 and rod 78 are secured to tube 34 by other mechanical means such as through the use of threaded engagements. For example, rod 78 can be threaded into surface 88, while cap 74 can be threaded onto exterior surface 64. Cap 74 forms an extension of tube 34. Disk 76 is comprised of any suitable material, such as the same material as rod 78 or another stainless steel alloy, and can be fastened to rod 78 by any suitable means, such as welding, brazing or mechanical fastening.

In this embodiment, cap 74 extends axially downward from surface 88 of tube 34. Cap 74 comprises a disk-shaped cylindrical body that is hollowed out to form internal area 86. In other words, cap 74 comprises a flat, circular end wall surrounded by a cylindrical ring side wall. However, cap 74 may have other shapes to achieve other desirable results, such as being dome-shaped to reduce drag. Cap 74 is approximately the same diameter as end 40 of tube 34 in the depicted embodiment. However, cap 74 may be other sizes, such as smaller than the diameter of tube 34. Internal area 86 is sized to allow disk 76 adequate space to move within cap 74 when vibrated. Cap 74 is therefore sufficiently deep to accept rod 78 and disk 76 and to permit displacement of disk 76.

Rod 78 extends axially downward from second end 40 of tube 34, generally coaxially with temperature sensor 14. Rod 78 may, however, be positioned in other orientations. In one embodiment, rod 78 is centered on end face 88 of tube 34. Rod 78 has a uniform cross-section so as to provide uniform deflection and damping coefficient c in all directions. In the disclosed embodiment, rod 78 comprises a cylindrical body having flat end surfaces for joining with disk 76 and surface 88. As shown, the length of rod 78 can be greater than the diameter of rod 78 so as to decrease the spring rate k and increase the pendulum effect. However, the length need not be greater than the diameter to provide a pendulum effect to disk 76 sufficient to achieve damping. Disk 76, in the embodiment shown, comprises a cylindrical body having flat end surfaces. The diameter of disk 76 is larger than the height of disk 76 so as to provide a mass m with a compact center of gravity for joining to rod 78, thereby reducing the footprint of absorber mass 16 within the process fluid flow.

Vibration of thermowell 18 induces movement of rod 78 and disk 76. As with the embodiment of FIG. 2, the characteristics of pendulum 72 are selected to absorb vibration of thermowell 18, thereby preventing vibration at resonance and the accumulation of repetitive fatigue stress. Pendulum 72, however, comprises a more complex system wherein the parameters of rod 78 and disk 76 can both be modified to produce the desired damping. For example, the length and diameter of rod 78 will predominately contribute to the spring rate k while the size of disk 76 will predominately contribute to the mass m of pendulum 72. The damping coefficient c comes from the retarding force proportional to the velocity of pendulum 72 through the fluid.

Further, disk 76 may preferably include holes 80 that permit fluid within internal area 86 to contribute to the spring constant k and damping coefficient c pendulum 72. Holes 80 extend through disk 76 in different orientations to provide damping in a plurality of directions. For example, with respect to FIG. 3, three holes extend horizontally across the width of disk 76, while two holes are shown extending straight into disk 76. Similarly, disk 76 can be comprised as a porous body having a network of tortuous channels integrally formed within the body. In one embodiment, the porous body comprises a sintered metallic body. As with the embodiment of FIG. 2, disk 76 need not be provided with any holes for the fluid to provide a damping effect, such as when the fluid moves past disk 76. The fluid can be a liquid or a gas and is selected to retain fluid properties, most notably viscosity, over the entire temperature range to which thermowell 18 will be subjected.

Figure 4A:
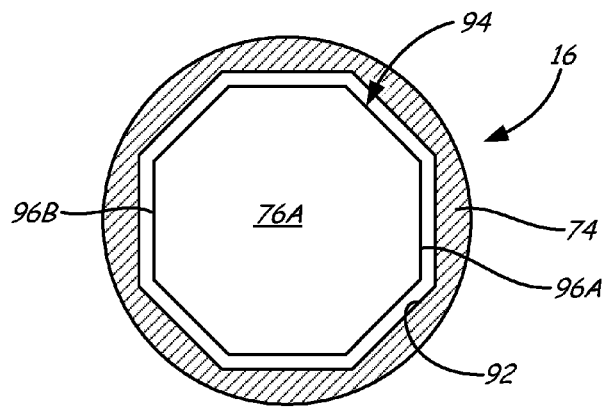
FIGS. 4A-4C are lateral cross-sectional views of the thermowell of FIG. 3 in which various shaped vibration absorber masses are configured to additionally provide squeeze film damping.
Figure 4B:
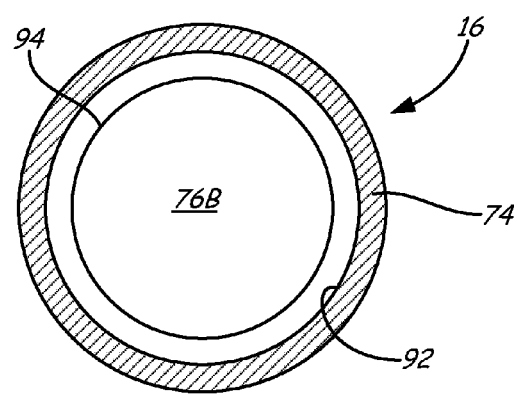
Figure 4C:
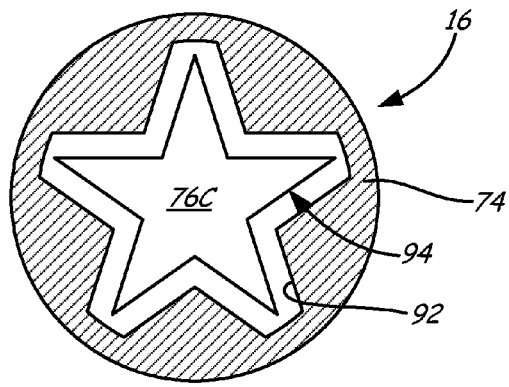

FIGS. 4A-4C are lateral cross-sectional views of absorber mass 16 of FIG. 3 in which various shaped disks 76 are configured to additionally provide squeeze film damping.

FIG. 4A shows a polygonal shaped disk 76A. FIG. 4B shows a circular shaped disk 76B. FIG. 4C shows a stellate shaped disk 76C. Squeeze film damping occurs when two surfaces are in close proximity to each other with a fluid disposed between them. The surfaces are positioned close together so that the fluid can be "squeezed" and "stretched" to slow movement of the surfaces relative to each other. Squeeze film damping is effective when there is a large surface area to gap length ratio. A suitable squeeze film damping effect for the present invention can be achieved with gap lengths of up to approximately one millimeter for damping fluids such as silicone oil. However, other gap lengths can be effective for other damping fluids.

In the context of the present invention, the surfaces are concentric with a fixed volume of fluid being contained between them. The outer concentric surface is inner side 92 of cap 74, and the inner concentric surface is outer side 94 of disk 76. As disk 76 vibrates to come closer to cap 74, surface 94 squeezes and stretches the fluid against surface 92 on opposite sides of the direction of motion. Specifically, with reference to FIG. 4A, outer surface of 94 disk 76A comprises an octagon including surfaces 96A and 96B. As surface 96A moves closer to inner surface 92, the fluid is pushed out of (squeezed) the area between cap 74 and disk 76, while the fluid is pulled into (stretched) the area between surface 96B and inner surface 92. The viscosity of the fluid when squeezed limits the rate at which the fluid will flow out from the area between surfaces 92 and 96A. Likewise, the viscosity of the fluid when stretched will limit the rate at which fluid will flow into the area between surfaces 92 and 96B. The squeezing and stretching produces a back pressure between the surfaces that causes damping. The damping is more effective with increased surface areas. As such the polygonal and stellate shaped surfaces of disks 76A and 76C allow for more fluid to be stretched and squeezed, as compared to circular disk 76B. Any shape of disk 76 can be used that is directionally independent with respect to the rotational orientation of disk 76 with cap 74. For example polygons and stars having more or fewer faces than shown in FIGS. 4A and 4C can be used. Squeeze film damping can also be provided in the embodiment of FIG. 2 wherein cylinder 58 is placed in close proximity to interior surface 66 of tube 34 such that direction $y_2$ is small.

Figure 5:
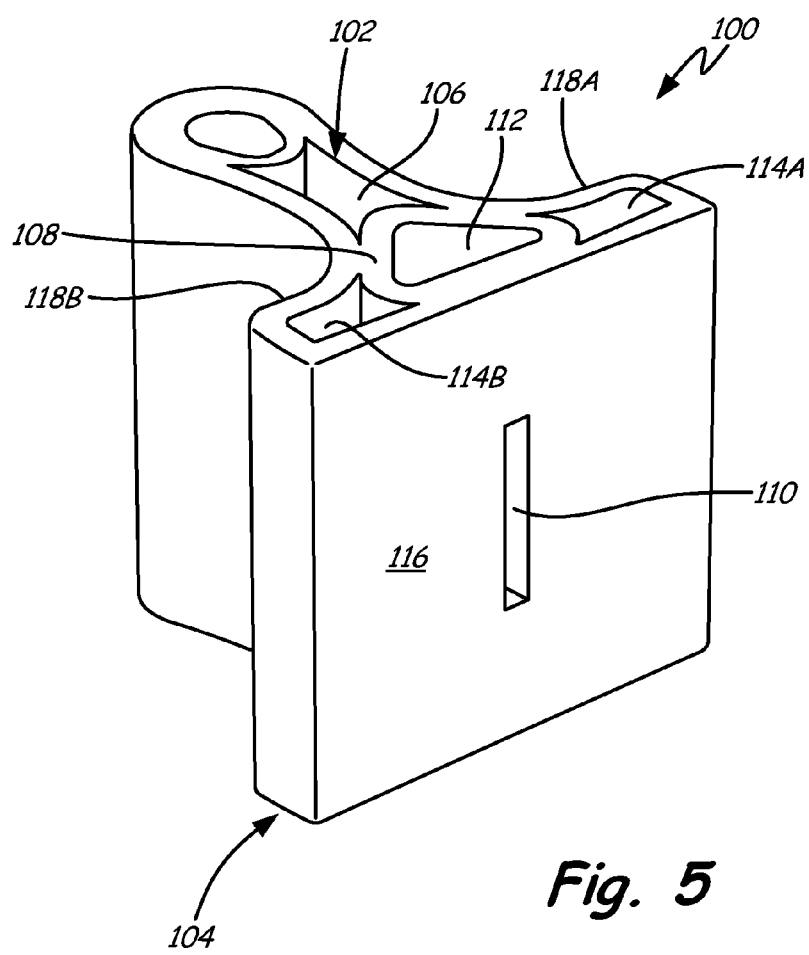
FIG. 5 is a partial perspective view of another embodiment of the invention wherein the sensor housing comprises an averaging pitot sensor to which the vibration absorber mass can be coupled.

FIG. 5 is a partial perspective view of another embodiment of the invention wherein the sensor housing comprises averaging pitot sensor 100 to which a vibration absorber mass can be coupled. Averaging pitot sensor 100 includes upper portion 102, lower portion 104, interior cavity 106, divider 108, first opening 110, first chamber 112, second chambers 114A and 114B, first planar surface 116 and second planar surfaces 118A and 118B. Averaging pitot sensor 100 comprises a section of a longer tube that is coupled to a transmitter housing, such as housing 22 of FIG. 1. Upper portion 102 faces towards housing 22 where averaging pitot sensor 100 joins to hole 50 (FIG. 1). Lower portion 104 faces towards process fluid PF (FIG. 1). A differential pressure sensor is coupled to the upper end of averaging pitot sensor 100 within housing 22 so as to be in electronic communication with circuitry 26 (FIG. 1), and in fluid communication with interior cavities 112 and 114A and 114B. For example, averaging pitot sensor 100 can be used in conjunction with an Emerson® 3051S Ultra industrial process transmitter.

Divider 108, which includes first chamber 112, extends into interior cavity 106 to form second chambers 114A and 114B. First opening 110 extends through first planar surface 116 of averaging pitot sensor 100 to communicate with first chamber 112. First opening 110 may comprise a single slot as shown in FIG. 5, a plurality of slots extending along surface 116, a single opening, such as a hole, along first planar surface 116, or a series of openings along first planar surface 116. Second planar surfaces 118A and 118B include second openings (not shown) to communicate with second chambers 114A and 114B, respectively. The aforementioned differential process transmitter is coupled to averaging pitot sensor 100 so as to have one diaphragm exposed to first chamber 112 and a second diaphragm exposed to second chambers 114A and 114B, as is known in the art. In one embodiment, averaging pitot sensor 100 comprises a Rosemount 485 Annubar® as is commercially available from Rosemount Inc., Eden Prairie, Minn. In another embodiment, averaging pitot sensor 100 comprises a Rosemount 585 Annubar® as is commercially available from Rosemount Inc., Eden Prairie, Minn. First planar surface 116 faces into the flow of process fluid so the transmitter can sense stagnation pressure, while second planar surfaces 118A and 118B face away from the process fluid flow so the transmitter can sense the pressure in the wake. Although described with respect to an averaging pitot sensor having a tube with a T-shaped cross-section, other tube shapes for averaging pitot sensors can be used. For example, averaging pitot sensor 100 may have a diamond shape or a rectilinear shape. Additionally, averaging pitot sensor 100 need not have planar surfaces and can have circular or oval cross-sections.

The vibration absorber masses of the present invention can be coupled to the lower end of averaging pitot sensor 100. For example, lower portion 104 can be closed so that a cap, rod and disk, similar to that of cap 74, disk 76 and rod 78 of FIG. 3, can be joined to the exterior of averaging pitot sensor 100. Additionally, lower portion 104 can be opened so that a cantilevered beam, such as beam 53 of FIG. 2, can be inserted into interior cavity 106 and closed with a plate, such as plate 56 of FIG. 2. Mounted as such, the vibration absorber masses can be configured to reduce or eliminate vibration of averaging pitot sensor 100 as described above.

The present invention provides a method and apparatus for reducing vibration of sensor probe housings that are positioned within process fluid flows when in use. For a given sensor housing that is configured for insertion into a particular range of turbulent process fluid flows, resonance frequencies for the sensor housing within the range are determined. An absorber mass is correspondingly built to vibrate in the flow range with sufficient force to dampen resonance vibration of the sensor housing. In some embodiments of the invention, the absorber mass comprises a cantilevered body. The spring constant, damping coefficient and magnitude of the mass of the cantilevered body are selected to provide the damping necessary to reduce peak oscillations of the sensor housing. Reduction in the vibration of the sensor housing prolongs the life of the housing as well as the sensor element disposed therein. Sensor housing such as thermowell tubes for sensing temperature of a process fluid and pitot tubes or averaging pitot sensors for sensing pressure of a process fluid can be used with the absorber mass of the present invention.

The absorber mass is affixed to an interior or exterior of the sensor housing. In one embodiment, the absorber mass comprises a cantilevered beam, such as in the form of a hollow cylinder, extending into the sensor housing to surround the sensor. In another embodiment, the absorber mass comprises a cantilevered pendulum, such as in the form of a disk suspended from a rod, extending from the exterior of the sensor housing. However, these properties can be combined in other permutations. The absorber mass dampens peak amplitudes of vibrations of the sensor housing. The absorber mass can include internal passages, such as holes or porous channels, and be submerged in a fluid, such as air or a liquid, to further provide a damping mechanism. Further, the absorber mass can be configured as a squeeze film damper where fluid is disposed between two surface areas placed in close proximity. Additionally, the absorber mass can be combined with flow modifying elements to force separation of the boundary layer of the process fluid. When using such features, alone or in combination, the fatigue life of the sensor housing can be extended significantly. The damping and absorbing characteristics of each specific absorber mass can be individually designed and selected for sensor housings that are to be used in known process control systems where the process fluid flows within predetermined flow ranges, resulting in known turbulent forces. As such, the absorber mass properties may be adjusted or changed during production to provide customized sensor housings.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sensor probe comprises:
   a tube for placement in a process fluid flow within a fluid conduit, the tube comprising:
      a first portion for coupling to the fluid conduit; and
      a second portion for insertion into the process fluid flow, the second portion having a closed, terminal end;
   a sensor element in communication with the tube; and
   an absorber mass located at the closed, terminal end and coupled to the tube and is configured to dampen vibration of the tube when the tube is inserted in the process fluid flow, wherein the absorber mass comprises:
      a plate sealing the second portion of the tube such that the plate forms the closed, terminal end of the tube, and
      a cantilevered beam extending from the plate into the tube.

2. The sensor probe of claim 1 wherein the absorber mass has a mass, damping coefficient and spring rate configured to reduce peak amplitudes in a range of frequencies produced by the process flow.

3. The sensor probe of claim 1 wherein the sensor probe further includes:
   a fluid surrounding the absorber mass so as to be able to flow around the absorber mass.

4. The sensor probe of claim 3 wherein the absorber mass includes:
   a plurality of holes extending through the absorber mass.

5. The sensor probe of claim 4 wherein different holes of the plurality of holes extend through the absorber mass at different orientations.

6. The sensor probe of claim 4 wherein the absorber mass comprises a porous body.

7. The sensor probe of claim 3 wherein the absorber mass comprises a squeeze film damper.

8. The sensor probe of claim 1 wherein the tube includes:
   a flow modifying element extending from an exterior of the tube to reduce vortex-shedding of process fluid flowing past the tube.

9. The sensor probe of claim 1 wherein the absorber mass is cantilevered from the tube.

10. The sensor probe of claim 1 wherein:
    the first portion of the tube is open; and
    the sensor element extends into the first portion of the tube.

11. The sensor probe of claim 1 wherein the cantilevered beam comprises:
    a hollow cylindrical body surrounding the sensor element.

12. The sensor probe of claim 11 and further comprising:
    a fluid positioned between the cantilevered beam and the tube;
    wherein the beam is positioned in close proximity to the tube to achieve a squeeze film damping effect.

13. A method for absorbing vibration in a sensor housing configured for positioning in a process fluid flow within a fluid conduit, the method comprising:
    determining flow characteristics of the process fluid flow;
    determining a resonance frequency of a sensor housing to be positioned within the process fluid flow and coupled to the fluid conduit;
    configuring an absorber mass to vibrate and dampen resonance frequency vibration of the sensor housing for the flow characteristics;
    configuring the absorber mass to have a plate and a cantilever beam extending from the plate into the sensor housing; and
    affixing the absorber mass to a terminal end of the sensor housing, such that the plate seals and closes the terminal end of the sensor housing.

14. The method of claim 13 and further comprising:
    selecting a spring rate, damping coefficient and mass of the absorber mass so that the absorber mass will generate sufficient force to dampen vibration of the sensor housing; and
    placing the sensor housing within the process fluid flow.

15. The method of claim 14 and further comprising:
    passing a fluid around the absorber mass to further dampen vibration of the sensor housing.

16. The method of claim 13 and further comprising:
    passing the process fluid over a flow modifying element positioned on an exterior of the sensor housing to force separation of the boundary layer of the process fluid.

17. The method of claim 13 and further comprising:
    squeeze film damping a fluid between the absorber mass and the sensor housing.

* * * * *